United States Patent [19]
Ito

[11] Patent Number: 5,523,834
[45] Date of Patent: Jun. 4, 1996

[54] IMAGE FORMING APPARATUS HAVING RECORDING MATERIAL SEPARATING MEANS

[75] Inventor: Nobuyuki Ito, Oume, Japan

[73] Assignee: Canon Kabushiki Kaisha, Tokyo, Japan

[21] Appl. No.: 965,861

[22] Filed: Oct. 23, 1992

[30]   Foreign Application Priority Data

Oct. 25, 1991 [JP] Japan .................................. 3-307056

[51] Int. Cl.⁶ ............................ G03G 15/04; G03G 21/00
[52] U.S. Cl. ............................................. 355/315; 355/221
[58] Field of Search .................................. 355/221, 222, 355/315

[56]                References Cited

U.S. PATENT DOCUMENTS

| | | | |
|---|---|---|---|
| 3,620,615 | 11/1971 | Volkers | 355/315 |
| 4,239,373 | 12/1980 | Weikel | 355/221 X |
| 4,286,862 | 9/1981 | Akita et al. | 355/315 |
| 4,480,909 | 11/1984 | Tsuchiya | 355/221 |
| 4,533,618 | 8/1985 | Nishihama et al. | 355/221 X |
| 4,688,927 | 8/1987 | Oda et al. | 355/3 |
| 4,979,000 | 12/1990 | Hamada et al. | 355/315 |

FOREIGN PATENT DOCUMENTS

| | | | |
|---|---|---|---|
| 61-159678 | 7/1986 | Japan | 355/315 |
| 62-9375 | 1/1987 | Japan . | |
| 62-43681 | 2/1987 | Japan | 355/221 |
| 62-205978 | 9/1987 | Japan . | |
| 63-298265 | 12/1988 | Japan . | |
| 1-229277 | 9/1989 | Japan | 355/315 |
| 1-287589 | 11/1989 | Japan | 355/315 |
| 3-69977 | 3/1991 | Japan | 355/315 |

*Primary Examiner*—Fred L. Braun
*Attorney, Agent, or Firm*—Fitzpatrick, Cella, Harper & Scinto

[57]                ABSTRACT

An image forming apparatus includes an image forming device for forming an image on a recording material, the image forming device having a contactable member which is contactable with the recording material with electrostatic attraction force between the contactable member and the recording material; a separation discharger for electrically discharging the recording material upon separation of the recording material from the contactable member after image formation on the recording material, the separation discharger having a wire electrode and a shield electrode; wherein $Vp/f \leq 0.5$ is satisfied where Vp is a conveying speed of the recording material (mm/sec), and f is a frequency of a periodically changing voltage applied to the separation discharger (Hz), wherein the inside of the shield electrode is reduced toward the contactable member.

13 Claims, 6 Drawing Sheets

FIG. 8(A) $v_p$, Vpp~Ref
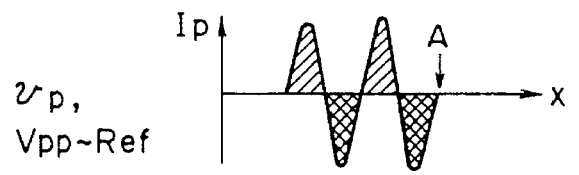
FIG. 8(B) $v_p \times 2$
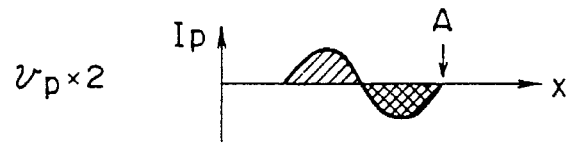
FIG. 8(C) $v_p \times 2$, Vpp×2
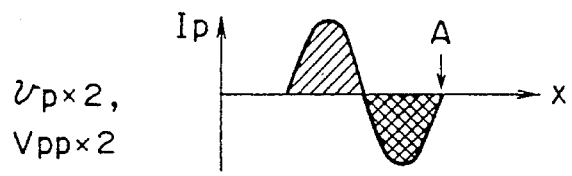
FIG. 9(A) Ref
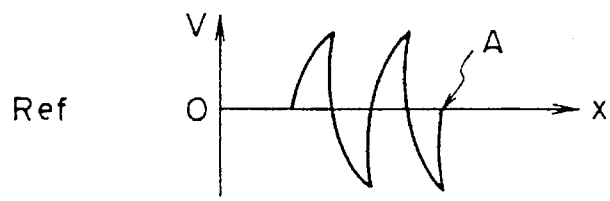
FIG. 9(B) $v_p \times 2$
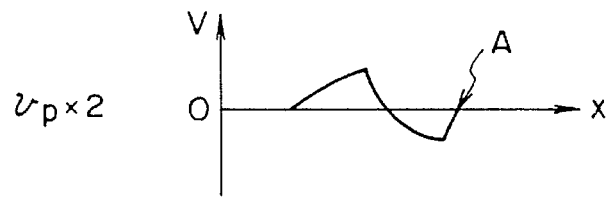
FIG. 9(C) $v_p \times 2$, Vpp×2
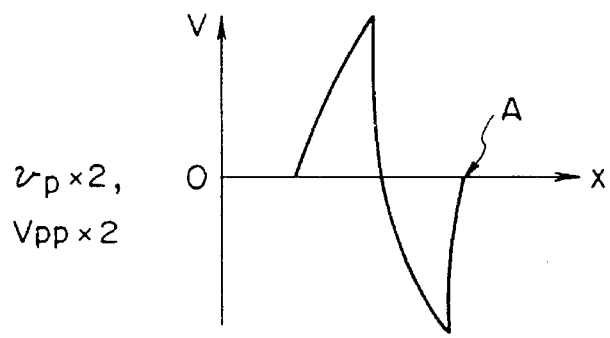

ial or recording material in the form of paper or sheet, the
IMAGE FORMING APPARATUS HAVING RECORDING MATERIAL SEPARATING MEANS

FIELD OF THE INVENTION AND RELATED ART

The present invention relates to an image forming apparatus such as an electrophotographic apparatus or electrostatic recording apparatus, which is provided with separating means for electrostatically separating a recording material.

In a known image forming apparatus in which a transferable toner image is formed on a surface of an image bearing member such as a photosensitive member and a dielectric member, is electrostatically transferred onto a transfer material or recording material in the form of paper or sheet, the electric charge applied to the transfer material during the transfer operation results in the tendency, after the image transfer operation, that the transfer material is attracted electrostatically to the image bearing member. Therefore some separating means is used to positively separate the transfer material from the image bearing member.

An electrostatic separating means has been proposed as a transfer material separating means, in which a separating charger is disposed at a predetermined position immediately after the image transfer position to apply electric charge having the polarity opposite to that of the transfer charger to the transfer material to neutralize or discharge the electric charge applied during the transfer operation, by which the attraction force toward the image bearing member is reduced. This electrostatic separation means is effective to a certain extent.

Generally, the separation charger is in the form of an AC corona discharger supplied with a DC biased AC voltage, and is called electrostatic separation system.

Referring first to FIG. 6, there is shown an electrostatic separation system, schematically. Adjacent the position where the transfer material P is contacted to the toner image T (charged to the negative polarity) on the image bearing member in the form of a photosensitive drum 1, a transfer charger 2 supplies to the backside of the transfer material P a transfer potential having the polarity (positive) opposite to that of the toner image T, so that the toner image T is transferred onto the transfer material P. Subsequently, in order to separate the transfer material P from the photosensitive drum 1 with the toner image T, an AC discharge operation is effected by a separation charger 3 for removing the transfer potential.

When the transfer material carrying speed Vp is increased in response to increase of the copy speed, the removal of the transfer potential becomes insufficient with the result of improper separation. In view of this, it will be considered that the peak-to-peak voltage Vpp of the AC voltage applied to the separation charger is increased.

However, the recent increase of the copy speed is remarkable with the result that it becomes difficult to maintain the transfer and separation performance by increasing the peak-to-peak voltage Vpp alone. More particularly, if the peak-to-peak voltage Vpp is too high, the toner image T may be deposited back to the photosensitive drum 1 during the separating action (back-transfer).

The problem is particularly remarkable in the case of high speed copying machines in which the transfer material feeding speed is not less than about 300 mm/sec. The problem is not remarkable in middle or low speed machines, but assisting mechanisms such as pre-transfer charger, pre-transfer exposure, air sucking (separation pawls, separation belt, scorotron separation charger or the like), in order to prevent the back-transfer. In any case, the disadvantages of high cost and poor durability, are involved.

On the other hand, it is general that a current difference which is a difference between an absolute value of the positive component and the absolute value of the negative component in the separation charger, is adjusted to provide a desired separation performance. If the current difference is directed strongly to the side of the same polarity as the transfer bias, an improper separation action occurs due to insufficient electric discharge of the transfer material. If it is strongly directed to the side of the polarity opposite to that of the transfer bias, the back-transfer is liable to occur due to excessive discharge. In order to effect stabilized separation, it is desirable that the proper current range of the current difference is large. In order to achieve this, Japanese Laid-Open Patent Application No. 9375/1987 proposes that an opening of a shield of the separation charger is provided with a grid electrically connected to an impedance element Z in an attempt to provide the above-described effect (FIG. 11). However, in long term use, the grid is contaminated with toner particles and paper dust, so that the expected function is not performed (after 200,000–300,000 sheets). In addition, the grid has a limited service life (it becomes easily broken after 500,000 sheets are processed), and therefore, the durability is not high.

As will be understood from the foregoing, the increase of the transfer material conveying speed Vp results in the improper separation or transfer-back, and the use of the grid in the opening of the separating charger involves in sufficient durability.

SUMMARY OF THE INVENTION

Accordingly, it is a principal object of the present invention to provide an image forming apparatus in which the improper separation or the back-transfer are effectively prevented.

It is another object of the present invention to provide an image forming apparatus having high durability.

It is a further object of the present invention to provide an image forming apparatus in which good separation is possible even if the recording material conveying speed is increased.

It is a further object of the present invention to provide an image forming apparatus in which durability of a grid electrode disposed in an opening of a shield of a separation discharger, can be increased.

These and other objects, features and advantages of the present invention will become more apparent upon a consideration of the following description of the preferred embodiments of the present invention taken in conjunction with the accompanying drawings. BRIEF DESCRIPTION OF THE DRAWINGS FIG. 1 is a schematic sectional view of an image forming apparatus according to an embodiment of the present invention.

FIG. 8 is graphs of discharging currents through a point Q before a separation point.

FIG. 9 is graphs of potential change corresponding to (1), (2) and (3) of FIG. 8.

DESCRIPTION OF THE PREFERRED EMBODIMENTS

Referring to the accompanying drawings, the description will be made as to the embodiments of the present invention.

Figure 1:
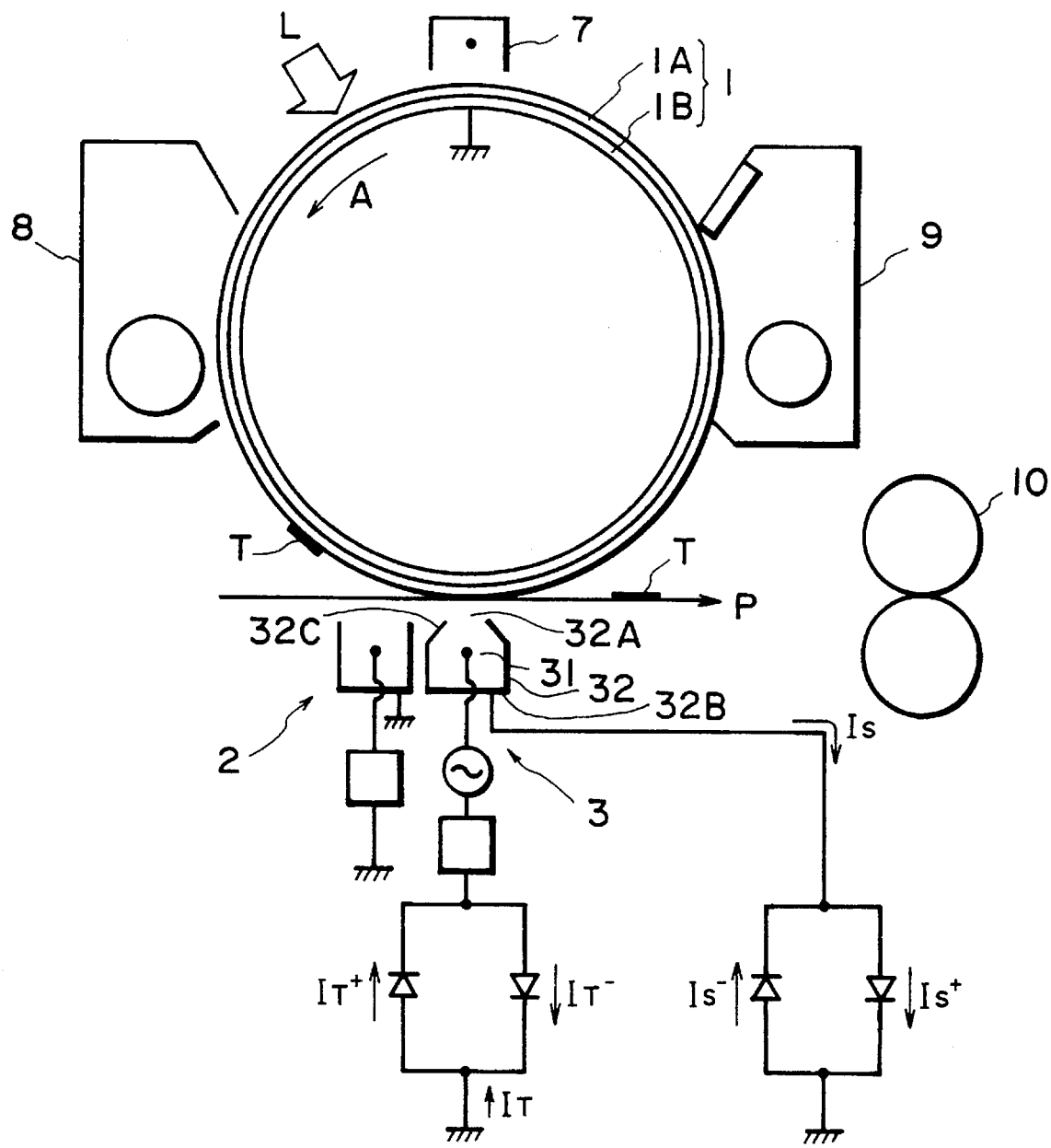

Referring to FIG. 1, there is shown an image forming apparatus according to an embodiment of the present invention. In this Figure, an image bearing member in the form of a photosensitive drum 1 is rotated in a direction indicated by an arrow A at a predetermined peripheral speed (=Vp mm/sec). In this embodiment, the photosensitive drum 1 comprises an amorphous silicon photosensitive layer 1A having a positive charging property and a conductive base electrically grounded and effective to support the photosensitive layer 1A. The photosensitive drum 1 is electrically charged to the positive polarity by a charger 7, and is exposed to image light L in accordance with image information representing original or the like, so that an electrostatic latent image is formed. The electrostatic latent image is developed by a developing device 8 with the toner particles charged to the negative polarity. The toner image T is developed and is transferred from the photosensitive drum 1 onto the recording material in the form of a transfer material P (paper or the like) by a transfer corona charger 2. At this time, the charger 2 is supplied with a voltage of the positive polarity which is the opposite from the charging polarity of the toner. The charger 2 supplies positive electric charge to the backside of the transfer material P. After the image transfer, a separation corona charger 3 removes the transfer charge from the backside of the transfer material P, thus diminishing the electrostatic attraction force between the photosensitive drum 1 and the transfer material P, so that the transfer material P is permitted to be separated from the photosensitive drum 1. The separation corona charger 3 comprises a wire electrode 31 and a shield electrode 32. The wire electrodes 31 is supplied with a DC biased AC voltage, in which the DC component has a negative polarity which is the opposite from the transfer charge polarity.

The transfer material carrying the toner image T is conveyed to an image fixing device 10, so that a toner image T is fixed on the transfer material P.

On the other hand, after the image transfer, the photosensitive drum 1 is cleaned by a cleaner 9 so that the residual toner is removed therefrom. Thereafter, the photosensitive drum 1 is uniformly exposed to light by an unshown pre-exposure lamp, so that the residual electric charge is removed to be prepared for the repeated image forming operation.

Figure 6:
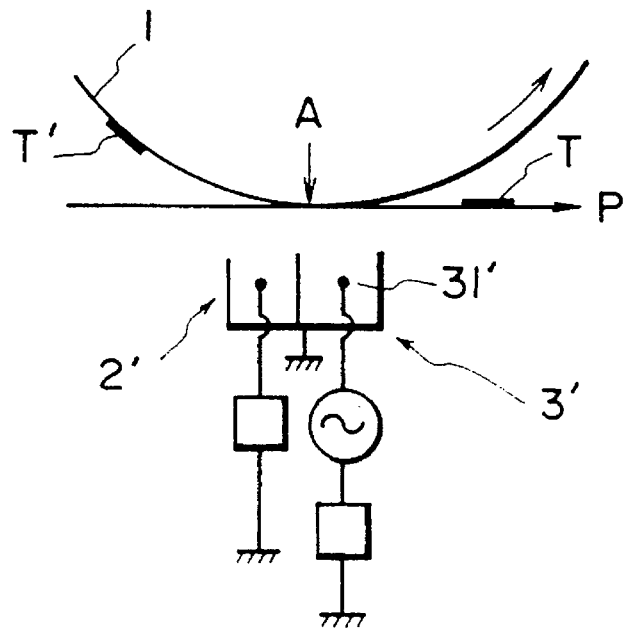
FIG. 6 is a side view of a transfer material separating device not using the present invention.

Referring to FIG. 6, the description will be made as to the case of a separation charger 3' shown in FIG. 6 which has a shield having a configuration which is different from that of FIG. 1 separation charger. In FIG. 6, a transfer charger 2' is supplied with a voltage having a polarity opposite from that of the charging polarity of the toner image T', and the separation charger 3' is supplied with a DC biased AC voltage in which the DC component has the polarity opposite from that of the transfer voltage.

Figure 7:
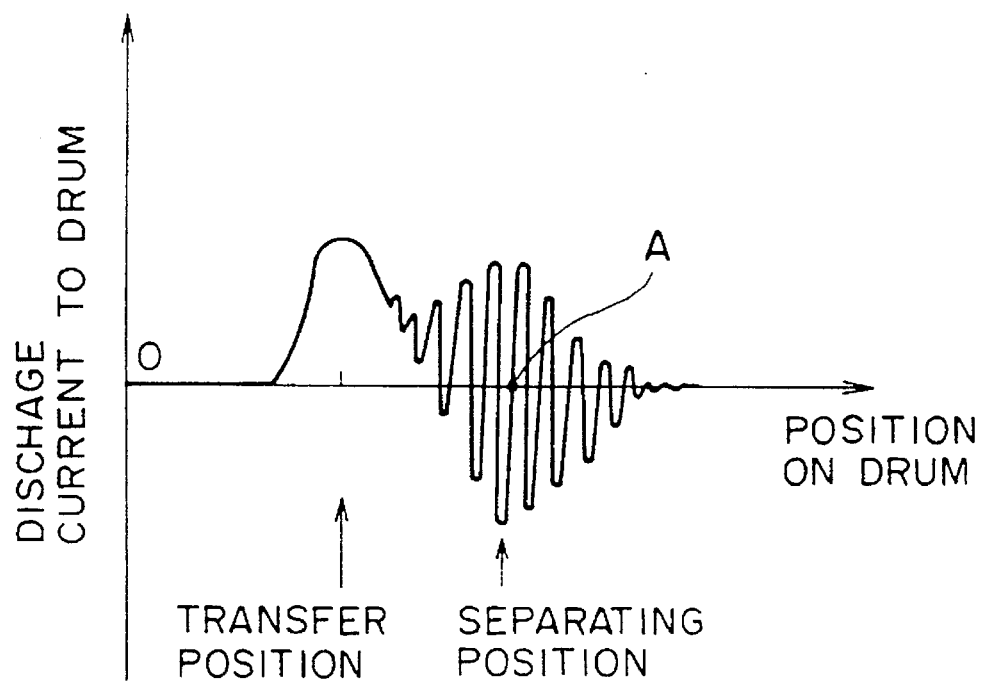
FIG. 7 is a graph of discharging current through a photosensitive drum.

FIG. 7 is a graph of the discharge current through the photosensitive drum from the transfer charger 2' and the separation charger 3' in FIG. 6. After the photosensitive drum 1 is subjected to the transfer discharge current having the polarity (positive) opposite from that of the toner, it is subjected to the AC discharge current for the electric discharge. FIG. 7 shows that the separation point A of the transfer material P from the photosensitive drum 1 is a point where the photosensitive drum 1 and the discharging wire electrode 31' of the separation charger 3' are closest, that is, where the discharge current from the separation charger 3' is largest. The separation at this point is most stable, since the received discharging current decreases, and therefore, the separation power decreases, after the point A.

If the copying speed is increased, and therefore, the transfer material conveying speed Vp is increased, the transfer potential is not sufficiently removed with the result of increase of liability of improper separation. In view of this, it would be considered that the peak-to-peak voltage to the separation charger is increased. However, if it is too large, the toner image may be transferred back to the photosensitive drum 1 (back-transfer).

Referring to FIG. 8, this will be described in more detail. In FIG. 8, (1) shows the AC discharge current Ip received from the separation charger with respect to a movement distance x of a point Q on the transfer material before the separation point A; (2) shows the same when the transfer material conveying speed Vp is doubled in which the period of the current Ip is twice, and the peak level of the current Ip is one half. Therefore, the total current received by the point Q before it reaches the point A, (|Ip+|+|Ip−|) is one half with the result of the liability of separation failure before the point A. In FIG. 8, (3) shows the case in which the voltage Vpp is increased so that the discharge current (|Ip+|+|Ip−|) is the same as in the case (1). By doing so, the separation power becomes equivalent to that of the case (1).

The change of the potential of the transfer material P having received the current Ip of FIG. 8, is shown in FIG. 9. Since it corresponds to an integration of |Ip|, and therefore, in the case of (3), the peak potential reaches twice the peak potential of the case (1). As a result, the back-transfer becomes liable when the Vpp is increased as in the case (3). If the transfer material conveying speed Vp is too high relative to a frequency f of the separation AC voltage, the back-transfer occurs in the form of stripes with a pitch of Vp/f. If this occurs, the separating action is instable.

Generally, a current difference Is which is the difference between the absolute value of a positive component of the separation discharge current and the absolute value of the negative component thereof, is adjusted to provide a desired separation function.

If the current difference Is is large in the side of the same polarity as the transfer bias, the separation becomes improper due to the insufficient electric discharge of the transfer material, and if it is large in the opposite side, the back-transfer becomes liable due to the over-discharge.

Figure 10:
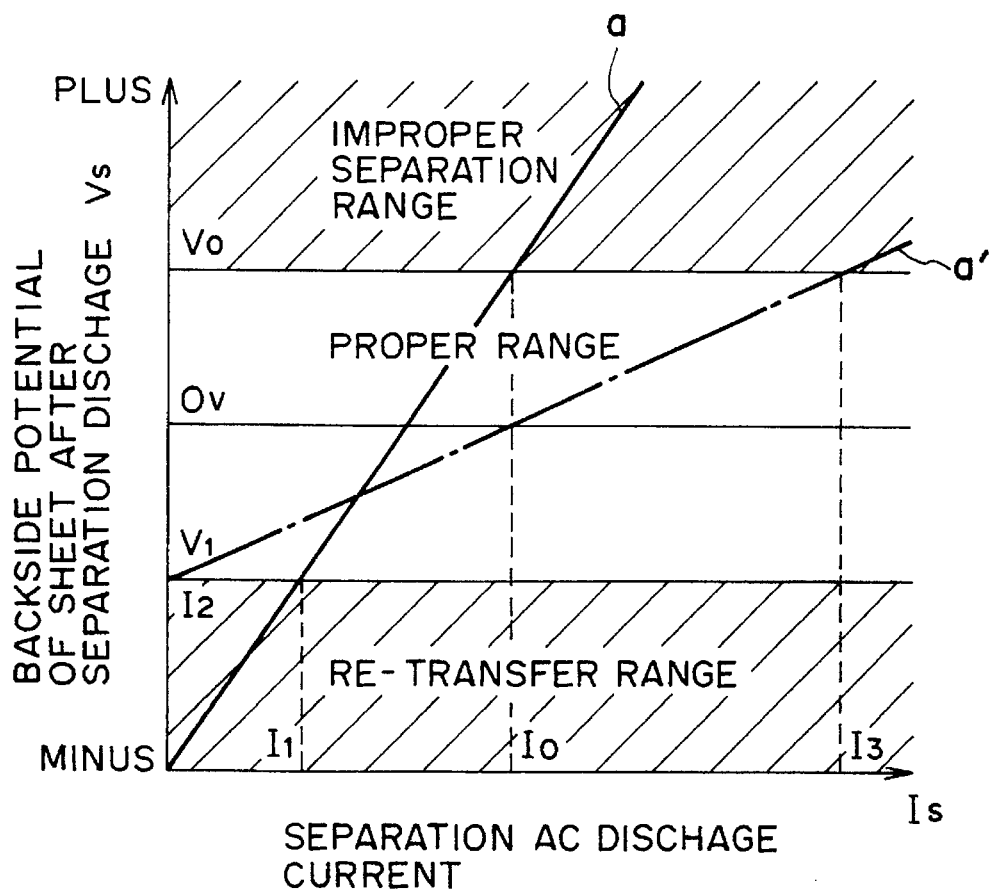
FIG. 10 is a graph showing a relationship between a change of current difference and a backside potential of the transfer material after the separation.

Referring to FIG. 10, the description will be made as to this point. In FIG. 10, there is shown a relationship between the current difference change in the separation charger 3' of FIG. 6 and the backside potential of the transfer material after the separation. When the relation therebetween changes as indicated by a in the Figure, the proper current difference is I0–I1. By setting the separation bias to satisfy the range, the proper separation becomes possible.

However, the proper range may change or reduce due the ambient conditions or copy modes. Therefore, in order to provide the stabilized separation at all times, it is desirable to increase the range.

As will be understood, it is desirable to decrease the inclination of the curve adjacent the point of 0 volt potential, as indicated by a', since then the proper current difference range can be expanded as indicated by I3.

In order to avoid the improper separation or the back-transfer even if the transfer material conveying speed is increased, $Vp/f \leq 0.5$ where Vp is the transfer material conveying speed, and f is a frequency of the AC voltage applied to the separation charger, and an opening, faced to the recording material, of the shield electrode of the separation charger is made smaller than the opposite end of the shield electrode, in this embodiment. That is, as shown in FIG. 1, the width of the opening is smaller than the inside width of the shield at the position where the wire electrode is disposed, by reducing the shield toward the opening.

Referring to FIG. 1, this will be described in detail. The separation charger 3 is disposed faced to the photosensitive member 1, and the opening of the shield of the separation charger 3 is reduced toward the photosensitive member 1, as shown in FIG. 1.

More particularly, the opening 32A is smaller than the shield bottom 32B.

Figures 11, 12, 13:
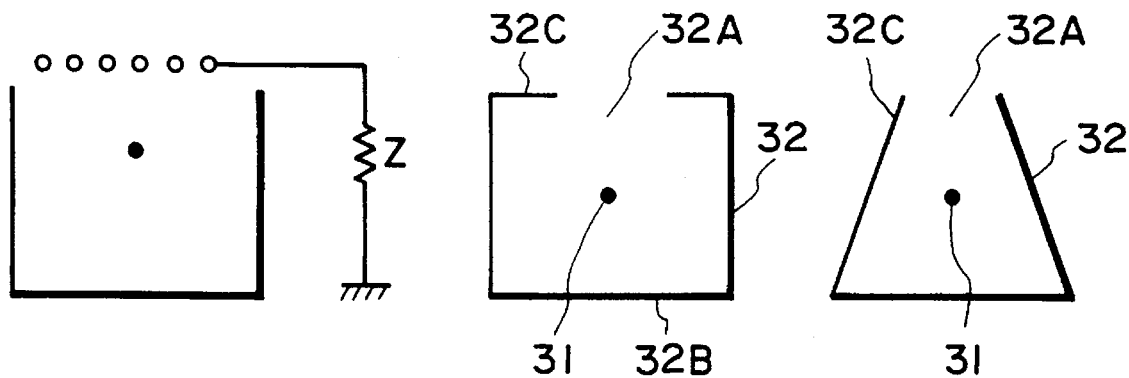
FIG. 11 is a side view of an opening of a separation charger with a grid.
FIG. 12 and 13 are side views of shields of separation chargers according to other examples.

FIGS. 12 and 13 show other examples satisfying this requirement. However, with the configuration of FIG. 12, the current tends to leak to the edge 32C of the shield 32 with the result of the tendency of the toner particles and the paper dust being attracted to the edge 32C. From this standpoint, FIG. 1 and FIG. 13 configurations are preferable in which the shield edge 32C is gradually away from the discharging electrode 31 comprising a wire. It is preferable that the discharge current into the shield is not less than 60% of the total discharge current. In addition, it is further preferable that the discharge current into the reducing portion of the shield is not less than 10% of the total discharging current. The percentages can be controlled by properly selecting the distances between the wire electrode and the portions of the inside surface of the shield.

By reducing the configuration of the shield, the similar effect as by provision of grid at the opening can be provided.

In the separation charger 3 of this embodiment, the transfer action is assured by increasing the frequency f of the separation AC voltage. This will be described in detail.

Figure 2:
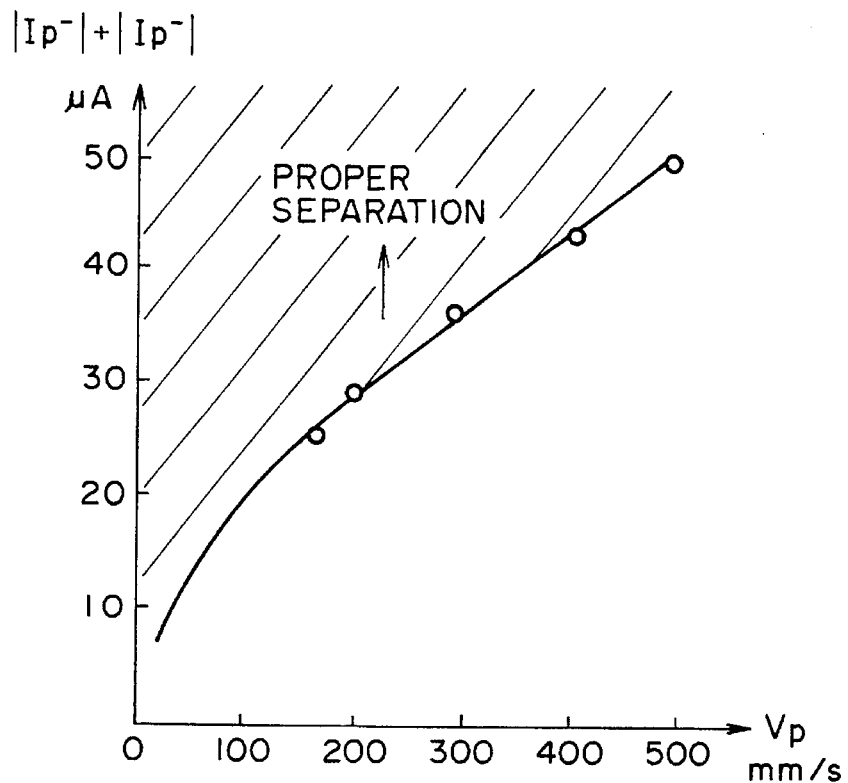
FIG. 2 is a graph showing a relationship between a transfer material conveying speed and a total discharging current.

The investigations have been made with respect to the total discharging current (|Ip+|+|Ip−|) flowing from the separation charger 3 into the transfer material P. This is obtained by subtracting a total shield current (|Is+|+|Is−|) to the shield 32 from a transformer output total current (|It+|+|It−|) into the discharging wire electrode 31 of the separation charger 3 shown in FIG. 1. FIG. 2 shows the total discharging current (|Ip+|+|Ip−|) relative to the transfer material conveying speed Vp, when the transfer material P is properly separated from the photosensitive drum 1. For this respective conveying speeds Vp, the proper current difference range (I1–I0 in the case of a in FIG. 10, for example) without improper separation and without back-transfer when the total discharging current for the proper separation is used, is determined.

Table 1 shows whether the range is practically usable or not.

TABLE 1

| Vp (mm/s) | Proper current difference range (f = 500 Hz) | | |
|---|---|---|---|
| 100 | | G | |
| 200 | (Improved charger opening) | G (f = 800 Hz) | (f = 1 kHz) |
| 300 | G ← F → G → E | | |
| 400 | F ← N → F → G | | |
| 500 | F ← N → N → F | | |

E: Remarkably expanded
G: Practically usable
F: Almost impractical (so small practical range that some is practical but the other is not)
N: Impractical (Hardly any proper range)

In Table 1, three right side data with the frequencies given, are for the case of using the separation charger in which the shield opening is not reduced. The leftmost data are for the separation charger having the reduced opening as shown in FIG. 1 with the frequency of 500 Hz.

As will be understood from this table, the proper current difference range reduces very much if the transfer material conveying speed Vp>300 mm/sec. For this reason, if the electrophotographic apparatus has a photosensitive drum and has a process speed Vp which is higher than 300 mm/sec, the above-described assisting device or devices (pre-transfer charger or the like) have to be used between the developing device and the transfer charger in most cases.

As will be understood from Table 1, it has been found that the separating performance is increased by increasing the frequency of the separation AC high voltage from 500 Hz to 800 Hz. The increase of the performance by the improvement of the opening of the separation charger (FIG. 1), the performance is also improved, as will be understood from the leftmost data in Table 1.

It has further been found that the performance is further improved if the frequency of the separation high voltage is increased to 1000 Hz. Thus, the performance is stabilized by the improvement of the charger, and the performance can be increased very much by the increase of the frequency.

Table 2 shows the results of the investigated proper current difference range for the various conveying speed Vp when the opening is reduced as shown in FIG. 1, and the frequency of the AC separating high voltage is increased.

TABLE 2

| Vp (mm/sec) | F (Hz) | | | | |
| | 600 | 800 | 1K | 1.2K | 1.4K |
|---|---|---|---|---|---|
| 300 | G (0.5) | E (0.38) | E (0.3) | E (0.25) | E (0.21) |
| 400 | F (0.67) | G (0.5) | E (0.4) | E (0.33) | E (0.29) |
| 500 | F (0.8) | F (0.63) | G (0.5) | E (0.42) | E (0.36) |
| 600 | N (1.0) | F (0.75) | F (0.6) | G (0.5) | E (0.43) |
| 700 | N (1.2) | N (0.88) | F (0.7) | F (0.58) | G (0.5) |

TABLE 2-continued

| | F (Hz) | | | | |
|---|---|---|---|---|---|
| Vp (mm/sec) | 600 | 800 | 1K | 1.2K | 1.4K |

( ): Vp/f (mm)
Test Conditions:
Room temp.: 24° C.
Humidity: 60% combination of the improvement of the configuration of the separation charger and increase of the frequency of the separation high voltage.

The values of Vp/f in the parentheses are spatial periods on the transfer material corresponding to the time periods of the separation AC high voltage.

Since the potential on the transfer material varies with this spatial periods, the reduction of the periods and the changing amount may be increased to improve the performance. The influence of this improvement is more sensitive if the surface resistance of the transfer material is smaller, and therefore, the consideration should be paid to the ambience under which the apparatus is used. Although $Vp/f \leq 0.5$ is desirable, the frequency f may be adjusted if necessary. In the transfer material separating device of this embodiment, when the transfer material conveying speed Vp is not less than 300 mm/sec, the frequency f is increased up to 600–1400 Hz, and the opening is reduced or converged.

In this embodiment, the toner image T provided by the development is charged to the negative polarity, and is attracted by the positive electric charge of the image on the photosensitive member 1. By the transfer charger 2 providing the positive corona discharge, the backside of the transfer material P is charged to the positive polarity, which is effective to attract the toner image T onto the transfer material. When the transfer material P proceeds toward the separation charger 3, the backside of the transfer material is electrically discharged by AC corona discharge. When the potential of the backside of the transfer material approaches 0 V, the transfer material P with the toner image T is separated from the drum 1 by the rigidity of the transfer material P, and it is conveyed to an image fixing device, and is discharged to the outside of the apparatus.

Figure 3:
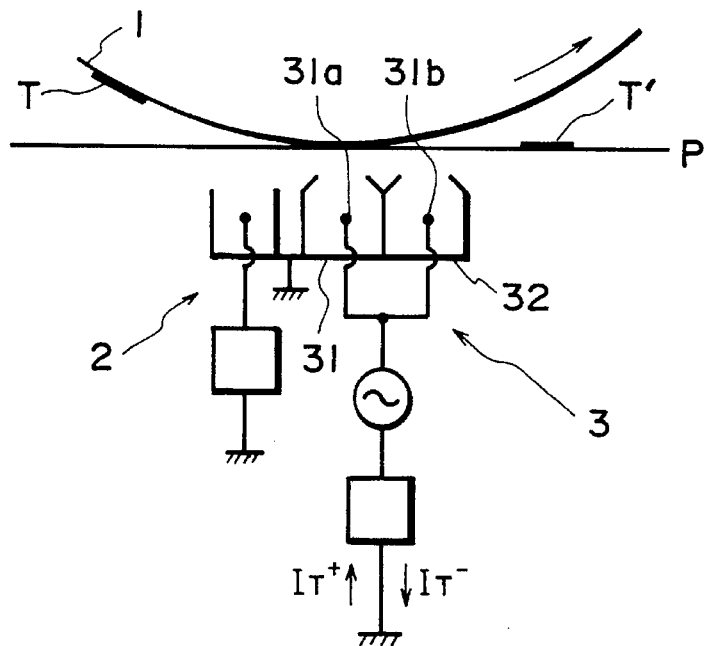
FIG. 3 is a side view of a transfer material separating device in an image forming apparatus according to a second embodiment of the present invention.
Figure 4:
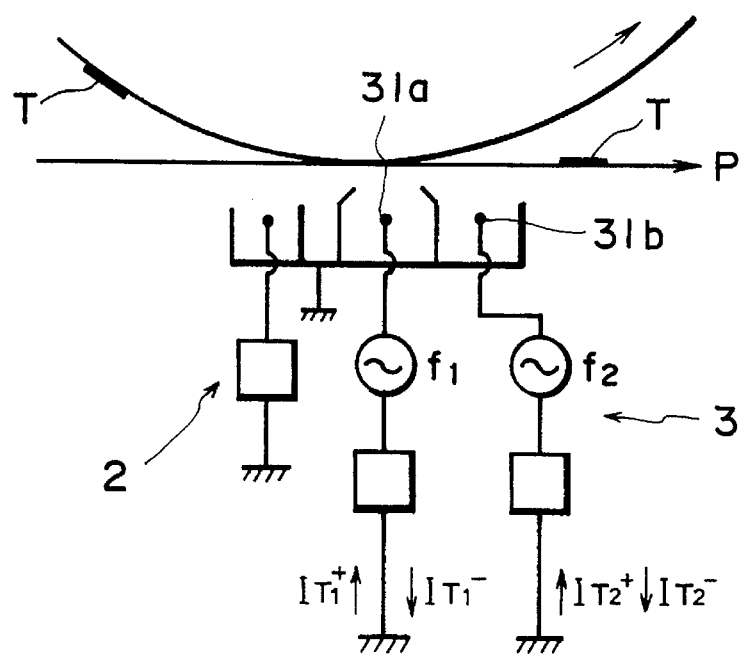
FIG. 4 is a side view of a separation charger which is a modification of the separation charger FIG. 3.

Referring to FIGS. 3 and 4, the description will be made as to a second embodiment of a separation charger. The fundamental structures are the same as in the first embodiment, and therefore, the structures except for the transfer station are omitted, and the same reference numerals as in the first embodiment are assigned to the element having the corresponding functions, and the detailed description thereof is omitted.

In this embodiment, as shown in FIG. 3, the separation charging means 3 comprises a first separation charger 31 and a second separation charger 32 to stabilize the separating performance. With such a structure, the total current from the transformer is doubled, and the discharging region is doubled. In case the first separation charger 31 does not sufficiently discharge the transfer material, the next separation charger 32 is effective to further discharge it. Therefore, the risk of the paper jam due to the paper or transfer material P wrapping around the photosensitive drum 1, can be remarkably reduced.

When the total current of the transformer output for the separation charger increases and when the frequency of the separation AC high voltage is increased, the problem of noise arises.

In view of this, FIG. 4 shows an embodiment in which the frequency of the AC voltage applied to the discharging wire electrode 31a and the frequency of the AC voltage applied to the discharging wire electrode 31b which is downstream with respect to the movement direction of the transfer material, are made different. For example, when the transfer material conveying speed Vp is approximately 400 mm/sec, the AC high voltage supplied to the separation charger is not less than 10 KVpp, and two discharging electrodes require total transformer output current (|It+|+|It−|) is as large as 1–2 µA. The used frequency is preferably not less than 800–1000 Hz, which, however, may be hard by people as corona noise in 3 case. Then, the consideration is paid to the fact that the upstream discharging electrode 31a is more effective in the separating power and the back-transfer prevention than the downstream one, and the downstream one has an auxiliary effect. Therefore, the voltage applied to the upstream wire electrode is given a higher frequency than the downstream one. The downstream wire electrode 31b is supplied with a voltage having such a low frequency (500 Hz) which is lower than the audible range, by which the volume of the audible range can be decreased. By doing so, the noise level is substantially equivalent to the case of single separation discharging electrode.

The reduced opening structure of the shield may be usable for both of the upstream and downstream separation dischargers, by which the contamination can be prevented in both of the chargers. However, in view of the above-described performance difference, the reduced opening structure of the shield may be used only in the upstream one, as shown in FIG. 4, if desirable.

In these embodiments, the separation charger is used to separate the recording material from the image bearing member. The present invention is not limited to such use.

Figure 5:
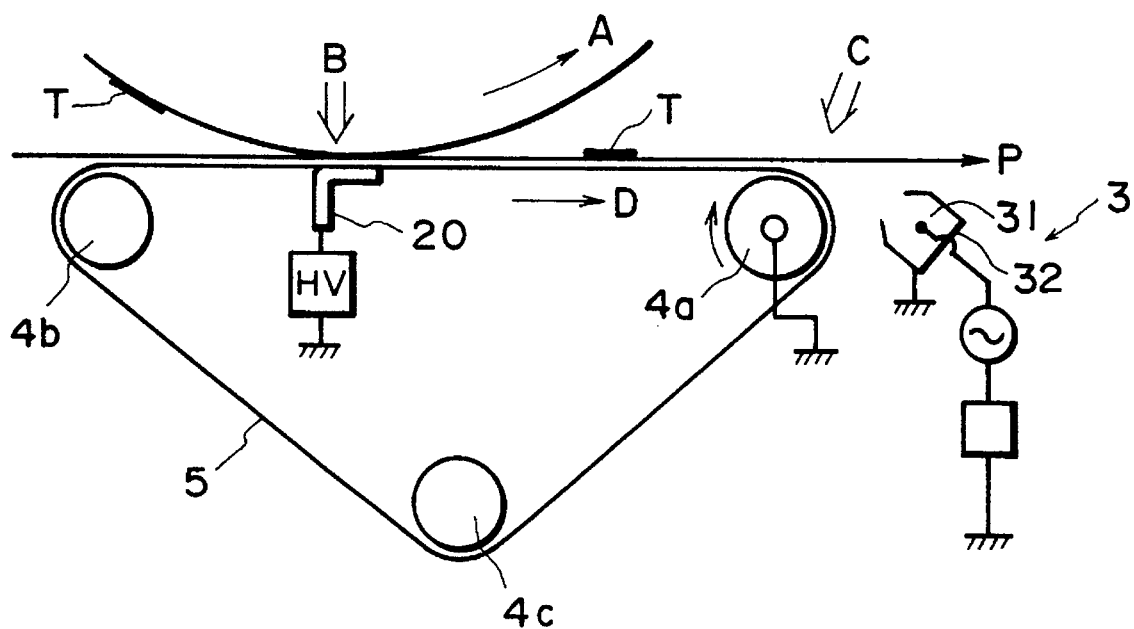
FIG. 5 is a side view of a transfer material separating device used in an image forming apparatus according to a third embodiment of the present invention.

Referring to FIG. 5, a device of a third embodiment will be described in which the separation charger is used to separate the recording material from a transfer belt. FIG. 5 is a side view of a major portion of an image forming apparatus using the separating device of FIG. 1.

A transfer belt 5 is trained around transfer belt supporting rollers 4a, 4b and 4c. To the transfer belt 5, a rotatable cylindrical photosensitive member 1 rotating in the detection indicated by an arrow A (Vp=300 mm/sec) is contacted, thus establishing an image transfer station B. The roller 4a is a conductive roller which is electrically grounded. In the transfer station B or position, there is a transfer member 20 for applying a transfer bias so as to face the photosensitive member 1.

The transfer belt 5 is made of dielectric material having a volume resistivity of approximately $10^{14}$ ohm.cm and has a thickness of approximately 50 microns. It rotates in the direction indicated by an arrow D in synchronism with the photosensitive member 1.

The transfer material P is supplied from the left of the transfer belt to the transfer position, where it is supplied with the transfer bias by the transfer member 20. The transfer bias voltage is −3 KV, for example, which constitutes an electric field. The toner image electrostatically formed on the surface of the photosensitive member 1 is transferred onto the transfer material P. The toner image is formed in the same manner as in the case of FIG. 1.

After the image transfer, the transfer material P is kept attracted on the transfer belt 5 electrically charged by the transfer member 20, and is conveyed to the right to the separating position C, where it is separated from the transfer belt 5 and is conveyed to an unshown image fixing station.

The residual charge on the transfer belt is dissipated by the time it reaches the position where the transfer material is separated from the transfer belt, and therefore, no special discharging means is required.

However, actually in the prior art apparatus, it takes 2–7 sec. for the charge to dissipate even under high humidity conditions. Therefore, in an apparatus having a high process speed or an apparatus which can not afford to a large space, the dissipation of the electric charge is insufficient. For this reason, the image defects resulting from peeling discharge at the position where the transfer material is separated from the transfer belt, can not be prevented assuredly. The time period required for the charge dissipation is different depending on the material of the transfer sheet, ambient conditions and transfer voltage, and therefore, the stabilized discharging function can not be expected.

In this embodiment, therefore, a separation charger 3 for effecting high frequency AC discharge (800 Hz) to a separating position C is disposed at the separating position C. The structure of the separation charger is the same as in FIG. 1. By doing so, the attraction of the transfer material P onto the belt 5 is quickly reduced, and therefore, the transfer material is easily separated from the transfer belt without occurrence of the peeling discharge. Therefore, the scattering of the toner and the local voids of the transfer can be prevented.

In the foregoing, the waveform of the AC voltage may be sine, triangular, rectangular or the like. The AC voltage may be in the form of the rectangular provided by periodically rendering on and off a AC voltage source, and various voltage which changes periodically is usable.

As described in the foregoing, the frequency of the AC voltage applied to the separation charger is increased in accordance with the conveying speed of the recording material, and the opening of the shield electrode is reduced, by which the improper separation, the back transfer, the image defects due to the separation discharge or the like, can be avoided with stability and with high durability.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

image forming means for forming an image on a recording material, said image forming means having a contactable member which is contactable with the recording material by an electrostatic attraction force between the contactable member and the recording material;

separation discharging means for electrically discharging the recording material so as to separate the recording material from the contactable member after image formation on the recording material, said separation discharging means having a wire electrode and a shield electrode;

where Vp/f>0.5 and Vp≦300 (mm/sec) are satisfied, where Vp is a conveying speed of the recording material (mm/sec) and f is a frequency of a periodically changing voltage applied to the wire electrode (Hz), the shield electrode having a reducing portion having a width decreasing toward the contactable member at a position more adjacent to the contactable member than to the wire electrode, wherein a current flowing to the shield electrode is not less than 60% of the overall current flowing through the wire electrode; and wherein a current flowing through the reducing portion is not less than 10% of the overall current flowing through the wire electrode.

2. An apparatus according to claim 1, wherein said contactable member is an image bearing member, and said image forming means includes transfer means for electrostatically transferring the image from said image bearing member onto the recording material.

3. An apparatus according to claim 2, wherein the voltage is in the form of an AC voltage biased with a DC voltage having a polarity opposite from a charging polarity of the transfer means.

4. An apparatus according to claim 1, wherein said shield electrode has a bottom portion which is larger than an opening thereof in a direction of conveyance of the recording material.

5. An apparatus according to claim 4, wherein said shield electrode has a constant width from a bottom thereof to said reducing portion.

6. An apparatus according to claim 1, wherein said separation discharging means comprises first and second separation corona dischargers which are provided along a direction of conveyance of the recording material in this order.

7. An apparatus according to claim 6, wherein said first separation corona discharger is provided with a first wire electrode and a first shield electrode, said second separation corona discharger is provided with a second wire electrode and a second shield electrode, wherein said first electrode has a width decreasing toward said contactable member, and a width of an opening of the second shield electrode is larger than a width of an opening of said first shield electrode.

8. An apparatus according to claim 7 wherein said first separation corona discharger is supplied with a first voltage having a periodically changing voltage level, and said second separation corona discharger is supplied with a second voltage having a periodically charging voltage level, and wherein said first voltage has a frequency higher than that of said second voltage.

9. An apparatus according to claim 6, wherein the first and second separation corona dischargers have respective shield electrode which are reduced toward said contactable member.

10. An apparatus according to claim 6, wherein the first and second separation corona dischargers are supplied with first and second voltages having periodically changing voltage levels, wherein the first and second voltages have different frequencies.

11. An apparatus according to claim 10, wherein the frequency of the first voltage is higher than that of the second voltage.

12. An apparatus according to claim 11, wherein the frequency of the second voltage is lower than audible range.

13. An apparatus according to claim 1, wherein said contactable member is a recording material carrying member for carrying the recording material, and said image forming means comprises an image bearing member and transfer means for transferring the image from said image bearing member onto the recording material carried on the recording material carrying member.

\* \* \* \* \*

UNITED STATES PATENT AND TRADEMARK OFFICE
CERTIFICATE OF CORRECTION

PATENT NO. : 5,523,834
DATED : June 4, 1996
INVENTOR : NOBUYUKI ITO

It is certified that error appears in the above-identified patent and that said Letters Patent is hereby corrected as shown below:

COLUMN 3

Line 8, "Fig. 8 is" should read --Figs. 8(A) - 8(C) are--;
Line 10, "Fig.9 is" should read --Figs. 9(A) - 9(C) are--;
Line 11, "(2) and (3) "should read --(B) and (C)--; and
Line 56, "electrodes 31" should read --electrode 31--.

COLUMN 4

Line 34, "(1)" should read --(A)--;
Line 37, "(2)" should read --(B)--;
Line 43, "(3)" should read --(C)--;
Line 45, "(1)." should read --(A).--;
Line 46, "(1)." should read --(A).--;
Line 50, "(3)," should read --(C),--;
Line 51, "(1)." should read --(A).--;and
Line 52, "(3)." should read --(C).--.

UNITED STATES PATENT AND TRADEMARK OFFICE
CERTIFICATE OF CORRECTION

PATENT NO. : 5,523,834

DATED : June 4, 1996

INVENTOR : NOBUYUKI ITO

It is certified that error appears in the above-identified patent and that said Letters Patent is hereby corrected as shown below:

COLUMN 5

Line 9, "due" should read --due to--; and

Line 15, "I3." should read --I3-I2.--.

COLUMN 7

Line 10, "combination" should read
--As will be understood from Table 2, the performance has been remarkably increased by the combination--; and
Line 16, "this" should read --these--.

COLUMN 8

Line 9, "hard" should read --heard--;
Line 10, "3" should read --this--.

COLUMN 9

Line 53, "$Vp/f > 0.5$ and $Vp \leq 30$" should read
--$Vp/f \leq 0.5$ and $Vp > 300$--.

UNITED STATES PATENT AND TRADEMARK OFFICE
CERTIFICATE OF CORRECTION

PATENT NO. : 5,523,834

DATED : June 4, 1996

INVENTOR : NOBUYUKI ITO

It is certified that error appears in the above-identified patent and that said Letters Patent is hereby corrected as shown below:

COLUMN 10

Line 39, "charging" should read --changing--; and
Line 43, "electrode" should read --electrodes--.

Signed and Sealed this

Eleventh Day of March, 1997

Attest:

BRUCE LEHMAN

Attesting Officer    Commissioner of Patents and Trademarks